United States Patent
Englert et al.

(10) Patent No.: US 9,615,177 B2
(45) Date of Patent: Apr. 4, 2017

(54) WIRELESS IMMERSIVE EXPERIENCE CAPTURE AND VIEWING

(71) Applicant: RAM Industrial Design, Inc., Syracuse, NY (US)

(72) Inventors: Robert S. Englert, Jamesville, NY (US); Meyer J. Giordano, Syracuse, NY (US)

(73) Assignee: SPHERE OPTICS COMPANY, LLC, Syracuse, NY (US)

( * ) Notice: Subject to any disclaimer, the term of this patent is extended or adjusted under 35 U.S.C. 154(b) by 2 days.

(21) Appl. No.: 14/640,197

(22) Filed: Mar. 6, 2015

(65) Prior Publication Data

US 2015/0254882 A1    Sep. 10, 2015

Related U.S. Application Data

(60) Provisional application No. 61/948,741, filed on Mar. 6, 2014.

(51) Int. Cl.

| | |
|---|---|
| *G09G 5/00* | (2006.01) |
| *H04R 5/04* | (2006.01) |
| *G02B 27/01* | (2006.01) |
| *G02B 27/00* | (2006.01) |
| *H04S 7/00* | (2006.01) |

(52) U.S. Cl.
CPC ........... *H04R 5/04* (2013.01); *G02B 27/0093* (2013.01); *G02B 27/017* (2013.01); *H04S 7/302* (2013.01); *G02B 2027/0178* (2013.01); *H04R 2499/15* (2013.01)

(58) Field of Classification Search
None
See application file for complete search history.

(56) References Cited

U.S. PATENT DOCUMENTS

| | | |
|---|---|---|
| 5,412,569 A | 5/1995 | Corby, Jr. et al. |
| 5,745,387 A | 4/1998 | Corby, Jr. et al. |
| 6,147,709 A | 11/2000 | Martin et al. |
| 6,813,085 B2 | 11/2004 | Richards |
| 6,891,518 B2 | 5/2005 | Sauer et al. |
| 7,292,240 B2 | 11/2007 | Okuno et al. |
| 7,402,743 B2 | 7/2008 | Clark et al. |
| 7,532,230 B2 | 5/2009 | Culbertson et al. |
| 7,893,935 B1 | 2/2011 | Neely, III et al. |
| 7,991,220 B2 | 8/2011 | Nagai et al. |

(Continued)

*Primary Examiner* — Ryan R Yang
(74) *Attorney, Agent, or Firm* — Patrick J. Daugherty; Driggs, Hogg, Daugherty & Del Zoppo Co., LPA

(57) ABSTRACT

Aspects capture, view, present and display photo-realistic, fully-immersive panoramic virtual environments, displaying to a user via a display screen, in a first layer at a first level of opacity, an image of current surroundings of the user from image data captured from the current surroundings of the user by an image capture device; and in a second layer at a second level of opacity, an image of another environment that differs from the current surroundings of the user as a function of time or of place, wherein the second layer is located coextensive with the first layer. The first level of opacity is selected to present image data of the panoramic image within the first layer as transparent relative to image data of the panoramic image within the second layer; or as opaque relative to image data of the panoramic image within the second layer.

17 Claims, 5 Drawing Sheets

(56) References Cited

U.S. PATENT DOCUMENTS

| | | |
|---|---|---|
| 8,314,815 B2 | 11/2012 | Navab et al. |
| 8,390,534 B2 | 3/2013 | Hamadou et al. |
| 8,514,295 B2 | 8/2013 | Lee |
| 8,547,401 B2 | 10/2013 | Mallinson et al. |
| 8,559,030 B2 | 10/2013 | Tsongas et al. |
| 8,577,601 B2 | 11/2013 | Li et al. |
| 8,585,476 B2 | 11/2013 | Mullen |
| 8,606,317 B2 | 12/2013 | Athesani et al. |
| 8,624,924 B2 | 1/2014 | Dobbins et al. |
| 8,625,018 B2 | 1/2014 | Bilbrey et al. |
| 8,627,227 B2 | 1/2014 | Matthews et al. |
| 8,644,551 B2 | 2/2014 | Hagbi et al. |
| D701,206 S | 3/2014 | Luckey et al. |
| 2002/0128541 A1 | 9/2002 | Kim et al. |
| 2012/0026071 A1 | 2/2012 | Hamdani et al. |
| 2012/0069051 A1* | 3/2012 | Hagbi ............... G06T 19/006 345/633 |
| 2012/0127284 A1* | 5/2012 | Bar-Zeev ........... G02B 27/017 348/53 |
| 2012/0223885 A1 | 9/2012 | Perez |
| 2013/0249902 A1* | 9/2013 | Byrne ............... G06T 15/503 345/419 |
| 2013/0257858 A1 | 10/2013 | Na et al. |
| 2013/0265333 A1* | 10/2013 | Ainsworth ........... G06F 3/017 345/633 |
| 2013/0314402 A1* | 11/2013 | Furumura ........... G03B 35/02 345/419 |
| 2013/0346168 A1 | 12/2013 | Zhou et al. |
| 2014/0049558 A1 | 2/2014 | Krauss et al. |
| 2015/0073907 A1* | 3/2015 | Purves ............... G06Q 20/32 705/14.58 |

* cited by examiner

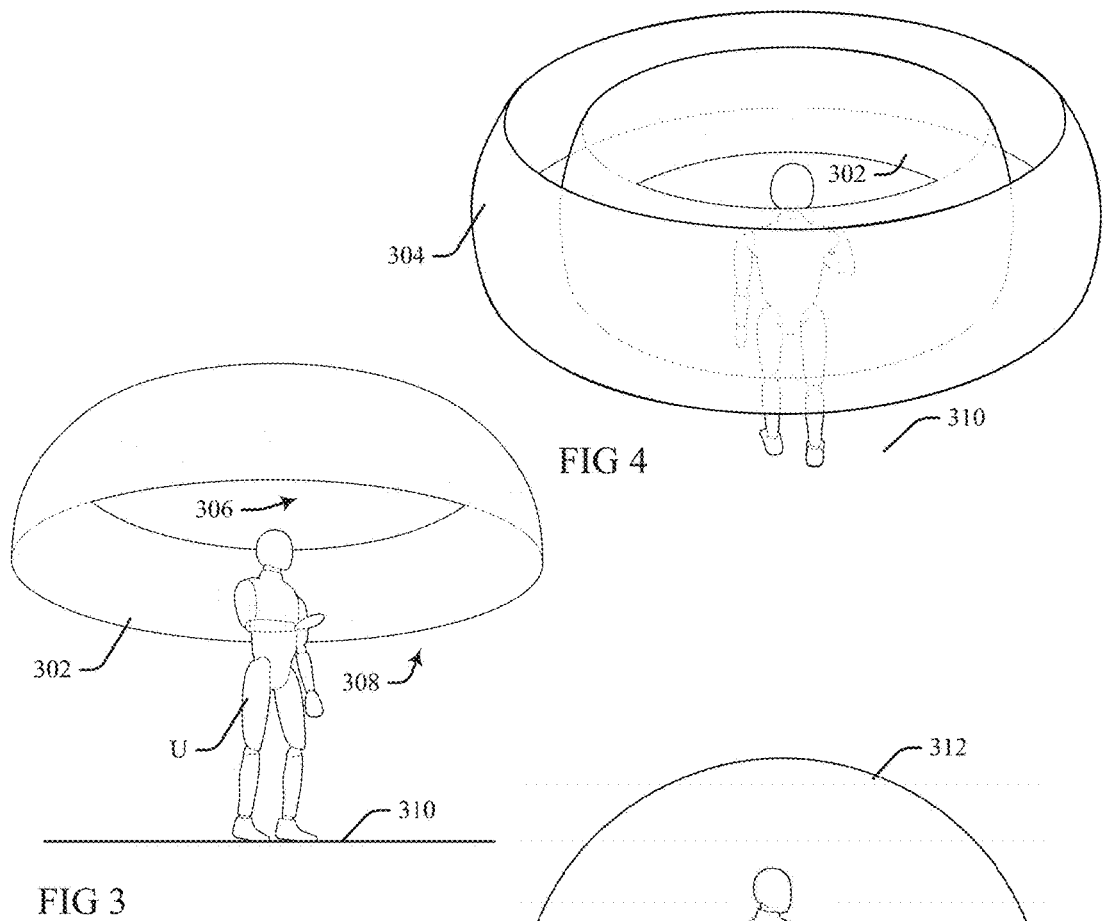
FIG 4
FIG 3
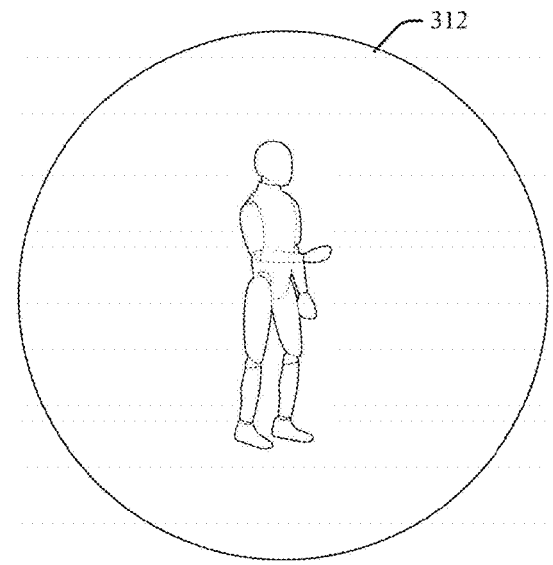
FIG 5

WIRELESS IMMERSIVE EXPERIENCE CAPTURE AND VIEWING

FIELD OF THE INVENTION

Aspects of the present invention relate to the generation and management of virtual reality and augmented reality presentations to a user.

BACKGROUND

Virtual reality (VR) refers to the replacement of sensory perception data of an environment inhabited by a user with computer-generated data, in some aspects to enable a user to experience an entirely different world from the present physical location of the user. For example, a user at home during cold winter months may engage a VR device to convey imagery and sounds from a beach vacation destination many miles away. Augmented reality (AR) refers to presentations of combinations of real-world and generated elements, sometimes by processing a camera feed through a computer to add generated elements before displaying it to the user, such as a heads-up display of navigation routing overlay that is superimposed on a camera feed of a street presently being travelled by the user. Some systems may provide both VR and AR capabilities, wherein an AR display device that blends real-world camera image feeds with computer generated data may be used to generate VR displays by dropping the real-world image data from a camera feed, leaving only generated or artificial world views.

BRIEF SUMMARY

In one aspect of the present invention, a method for capturing, viewing, presenting and displaying photo-realistic, fully-immersive panoramic virtual environments includes displaying to a user via a display screen, in a first layer at a first level of opacity, an image of current surroundings of the user from image data captured from the current surroundings of the user by an image capture device; and in a second layer at a second level of opacity, an image of another environment that differs from the current surroundings of the user as a function of time or of place, wherein the second layer is located coextensive with the first layer. The first level of opacity is selected to present image data of the panoramic image within the first layer as transparent relative to image data of the panoramic image within the second layer; or as opaque relative to image data of the panoramic image within the second layer.

In another aspect, a system has a hardware processor in circuit communication with a computer readable memory and a computer-readable storage medium having program instructions stored thereon. The processor executes the program instructions stored on the computer-readable storage medium via the computer readable memory and thereby displays to a user via a display screen, in a first layer at a first level of opacity, an image of current surroundings of the user from image data captured from the current surroundings of the user by an image capture device; and in a second layer at a second level of opacity, an image of another environment that differs from the current surroundings of the user as a function of time or of place, wherein the second layer is located coextensive with the first layer. The first level of opacity is selected to present image data of the panoramic image within the first layer as transparent relative to image data of the panoramic image within the second layer; or as opaque relative to image data of the panoramic image within the second layer.

In another aspect, a computer program product for capturing, viewing, presenting and displaying photo-realistic, fully-immersive panoramic virtual environments has a computer-readable storage medium with computer readable program code embodied therewith. The computer readable program code includes instructions for execution which cause the processor to display to a user via a display screen, in a first layer at a first level of opacity, an image of current surroundings of the user from image data captured from the current surroundings of the user by an image capture device; and in a second layer at a second level of opacity, an image of another environment that differs from the current surroundings of the user as a function of time or of place, wherein the second layer is located coextensive with the first layer. The first level of opacity is selected to present image data of the panoramic image within the first layer as transparent relative to image data of the panoramic image within the second layer; or as opaque relative to image data of the panoramic image within the second layer.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which:

FIG. 3 is a side perspective graphic illustration of a virtual reality construct presentation to a user by a device according to the present invention.

FIG. 4 is a rear perspective graphic illustration of the virtual reality construct presentation and user of FIG. 3.

FIG. 5 is a side perspective graphic illustration of a spherical virtual reality construct presentation to a user by a device according to the present invention.

DETAILED DESCRIPTION

Creating fully-immersive virtual environments and viewing them seems like a page ripped from science fiction, yet advances in technology have opened the door to such possibilities. Fully immersive virtual environments may allow users to figuratively transport themselves to other places and time. Several industries have worked on this idea from different points of view, including the military, gaming, computer interaction etc. However, prior art systems generally fail to provide easy-to-use systems that can effectively create, display and enable user interaction with photo-realistic, immersive environments.

Figure 1:
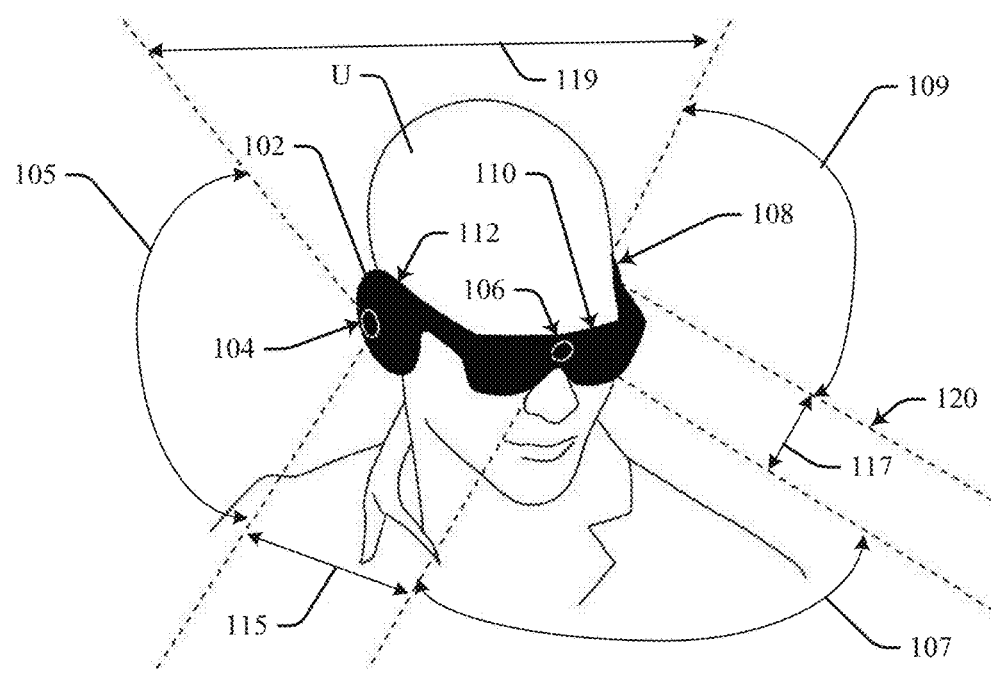
FIG. 1 is a side perspective graphic illustration of a device according to the present invention as deployed on a user.
Figure 2:
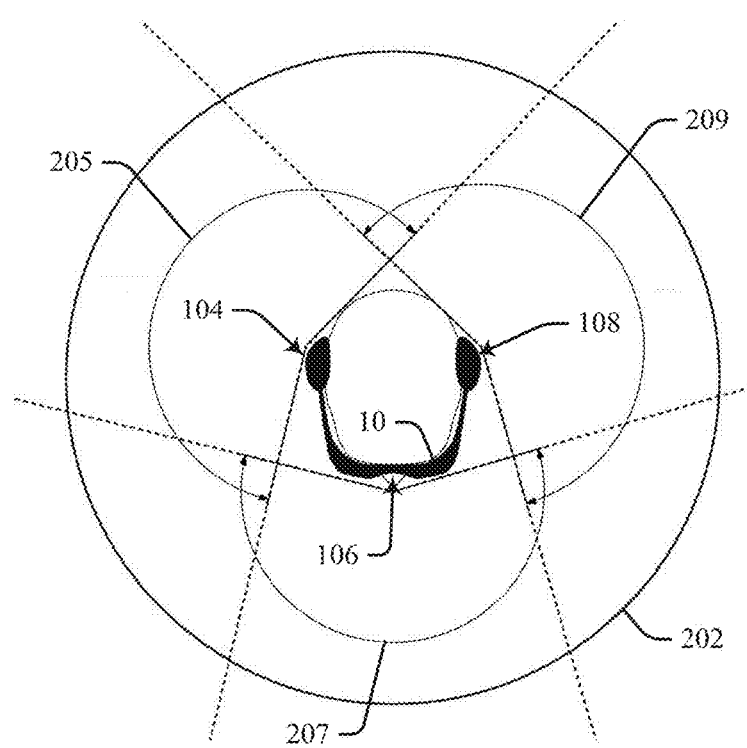
FIG. 2 is a top perspective graphic illustration of the device and user of FIG. 1.

Aspects of the present invention provide systems, method and processes for capturing, viewing, presenting and displaying photo-realistic, fully-immersive panoramic (for example, spherical) virtual environments in an easy to use way, including wireless systems and processes that free a user from being physically tethered to a computer or other specific device. Some presentations may be three-dimensional (3D). FIGS. 1 and 2 illustrate one example of a device or system 102 of the present invention that provides different and distinctive functions, including: (i) capturing sensory data from the surrounding world for use in presenting immersive experiences from three different image and sound capture devices 104, 106 and 108 that have cameras (or scanners or other image data capture components) and directional microphones (or other audio data capture components); and (ii) presenting sensory input data to the user wearing the device for viewing, hearing, etc., VR and AR constructs, including via display screens 110 located over each of the user's eyes and speakers 112 located over each of the user's ears.

The displays 110 and speakers 112 convey an immersive experience to the user U via images and sound, which may be of the present environment from a current, real-time perspective of camera/microphones 104, 106 and 108, or of an alternative virtual world that differs from current, real-time data from the camera/microphones 104, 106 and 108 via time or space. The alternative world data may be contemporaneous in time (streamed in real time from other cameras and microphones), or pre-recorded data or previously generated data from the same or other camera/microphone components 104, 106 and 108.

The present example included three separate, combination camera and sound microphone components 104, 106 and 108 that are arrayed in different locations about the device 10 relative to each other in a generally circular or spherical array in order to simultaneously record image and sound data from different perspectives. Other examples may use more or less numbers of cameras and microphones, deployed as combination or individual devices. The modular and customizable device 102 of the present example can be worn on the user's head as shown, or it may be deployed or attached to a wide variety of other applications, for example a tripod, helmet, vehicle, drone, etc.

Images acquired from the individual camera 104, 106 and 108 inputs are combined into a 360 degree panoramic image construct via a photo stitching or other combination process. A variety of stitching processes for combining multiple photographic images with overlapping fields of view may be used to produce continuous or segmented panorama, high-resolution images and thereby provide (or enable the generation of) 360 degree, panoramic video recording of the environment surrounding the device 10.

FIG. 2 illustrates overlapping fields of coverage 205, 207 and 209 of the wide-angle camera lenses of the respective camera/microphone devices 104, 106 and 108. In the present example, the fields of coverage 205, 207 and 209 of each lens is two hundred and ten (210) degrees, though other aspects may use different values and this is only an illustrative and not exhaustive example. The overlapping images are stitched together to generate a full 360 degree horizontal field of view 202 of the surrounding environment. Directional microphone components within each of the camera/microphone components 104, 106 and 108 simultaneously record or capture directional sound that is correlated with the overlapping image data.

The microphones may also have the overlapping fields of coverage 205, 207 and 209, or they may have the non-overlapping fields of coverage 105, 107 and 109 illustrated in FIG. 1. For example, FIG. 1 shows a gap 115 between the edge 120 of the span of audio coverage 105 of the directional microphone of the camera/microphone device 104, and the edge 120 of the span of audio coverage 107 of the directional microphone of the adjacent camera/microphone device 104; a gap 117 between the edge 120 of the span of audio coverage 107 of the camera/microphone device 104 and the edge 120 of the span of audio coverage 109 of the third camera/microphone device 108; and a gap 119 between the edge 120 of the span of audio coverage 105 of the first camera/microphone device 104 and the edge 120 of the span of audio coverage 109 of the third camera/microphone device 108.

The direction microphones record or stream audio acquired from the fields of coverage 105, 107 and 109. As will be appreciated by one skilled in the art, this audio data may be blended to provide a comprehensive surround sound effect, which allows a user to perceive sound data representative of regions within gaps 115, 117 and 119 between the fields of coverage and thereby provide an immersive illusion of hearing audio as if the user's two ears are located at the same positions within the acquired representation of the world. For example, the user may hear audience members located about the user as well as a performer on a stage. Audio data for the gap 115 may be provided by blending the audio data acquired from the camera/microphone devices 104 and 106 located on either side of the gap 115, in some aspects in proportions corresponding to relative positioning about the circumference 202 of the panoramic construct. One blend approach proportionally increases the amount of audio used from camera/microphone device 104 relative to audio acquired from camera/microphone device 106 as one travels along the gap 115 toward the coverage region 105 and away from the coverage region 107, and vice versa.

In some aspects, the non-overlapping fields of coverage 105, 107 and/or 109 may indicate gaps in camera lens coverage between adjacent camera lens at 104, 106 and 108. In such applications, the device 102 may use analytical processes to fill in coverage gaps to generate a representation of full 360 degree coverage of visual data from the surrounding environment, particularly when the device 102 is moving or traveling over a displacement distance when the audio and video data is acquired over time. Movement of the device 102 to acquire visual data over the gaps 105, 107 and/or 109 may be easily accomplished by rotating the device while mounted on a tripod, or by using scanning devices that themselves rotate to give complete 360 degree coverage when the device is fixed on a user's head or elsewhere. (Such rotating and moving scanning devices may enable the deployment of a single scanner to acquire visual data, rather than multiple cameras, as will be appreciated by one skilled in the art.) Movement of the device 102 sufficient to acquire data over any of said gaps may also be accomplished by movement of the user while wearing the device, such as while the user U travels through a physical environment by walking, riding a car or a bike, or also by turning his head and looking around while standing or sitting, or at given or specified waypoints while traveling a route, and other techniques will be apparent to one skilled in the art.

Thus, motion of the device 102 or the cameras or other image acquisition components at 104, 106 and 108 may enable the different spans of non-overlapping coverage 105, 107 and/or 109 to be transiently brought to bear on visual regions within the gaps in coverage 115, 117 or 119 at different times, and this acquired visual data may be used in a photo stitch process to assemble a complete 360 degree panoramic construct. For example, a park bench currently visible only within the gap area 115 may have been visible within the front-facing field of coverage 107 of the camera/microphone device 104 at an earlier time, when the user turned his head in that direction, or when the bench was previously in front of the user and within the field of view 107 during an earlier time of travel in the route of the user. Accordingly, the device 102 may use the data earlier acquired from the front-facing camera/microphone 106 to fill in the gap in coverage 115 of the current field of view via a stitching process.

Aspects of the invention generate (and/or record) panoramic, partial or total spherical audio-video experiences for current or subsequent playback on the device 102 to the user U, or to another user wearing another of the devices 102, perhaps remotely in another, entirely different physical location. FIG. 3 illustrates a partially spherical, panoramic concert hall image construct (image) 302 that spatially locates the user within a seat within a concert hall during a concert and that is displayed to a user U via the display screens 110 of the device 102. (To improve the simplicity and clarity of the graphic information conveyed by FIGS. 3, 4 and 5, the device 102 is omitted from these views.) FIG. 4 is another view of the image construct 302 that also depicts three-dimensional, surround-sound audio data 304 from the concert that is generated by the headphone speakers 112 of the device 102 from data acquired from directional microphone components of the camera/microphones 104, 106 and 108 of the device 102 (or another, similar device 102 worn by another user). The user is thus immersed and surrounded by the sound from the concert in a high-fidelity, surround sound experience construct 304 that together with the visual construct 302 allows the user to become more fully immersed and engaged by the concert.

In the example of FIGS. 3 and 4, a composite VR construct created by a combination of the visual 302 and audio 304 constructs comprises only a portion of the surroundings of the user. In this example, the user may enjoy experiencing a concert via the combination of constructs 302 and 304 while walking along a sidewalk 310 or engaged in another pedestrian activity, and while also simultaneously monitoring regions of the field of vision of the user outside of the panoramic image construct 302 (the upper area 306 above and the lower area 308 below the construct 302) for obstructions, other pedestrians, traffic signals and signage, etc. The user may thus be mentally immersed within the sensations available at any concert hall located anywhere in the world to enjoy a prerecorded or live concert, while in reality travelling along a sidewalk at home, at college, etc.

FIG. 5 illustrates a completely spherical VR construct 312 that entirely fills the possible field of vision of the user. In this example, the user is located within a boat, and sees the surroundings of the boat as experienced within a body of water near a distant shore, which may be augmented by sounds recorded or streamed from the point of view of the location within the boat. This may be especially enjoyable to experience in cold weather areas in the winter, when the user cannot presently otherwise engage in boating activities without travelling to another region with warmer weather.

The device may present the visual and audio imagery via a number of different components. In the present head-mounted example 102, a wireless computer (battery powered) drives display screens 112 (for example, liquid crystal display (LCD), organic light-emitting diode (OLED), Flexible OLED, and still others will be apparent to one skilled in the art) that are positioned close to the user's eyes. The display screens 112 may include adjustable (digitally or physically) or modular (replaceable) lens for each eye, in order to accommodate differences in vision capabilities (near sighted, far sighted, macular degeneration, etc.). They may also accommodate color blindness, by reformatting light spectrums not visible to a given user into another visible spectrum, or by presenting infrared signals to improve night vision and illumination of low-lighting scenes, and still other image augmentation processes may be deployed.

Figure 6:
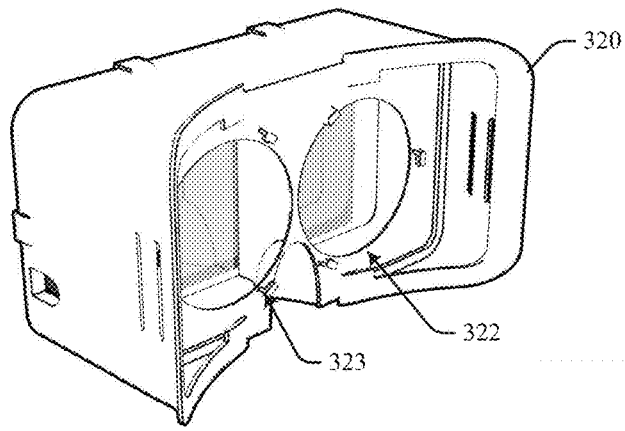
FIG. 6 is a rear perspective graphic illustration of device component according to the present invention.
Figure 7:
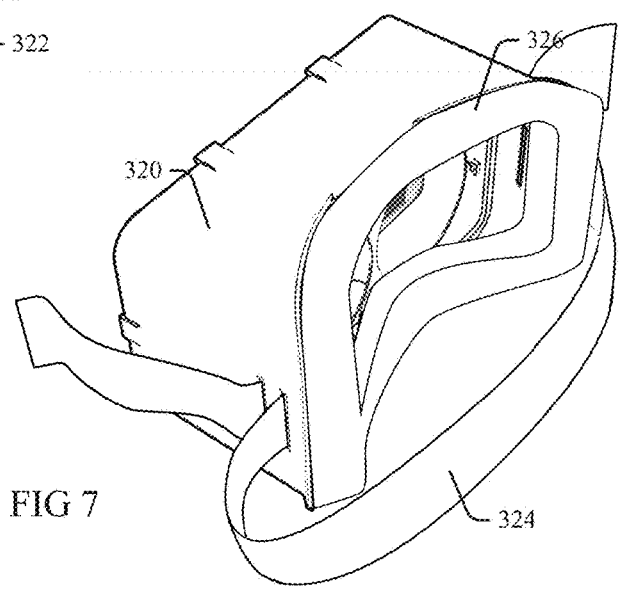
FIG. 7 is a top, rear perspective graphic illustration of the device component of FIG. 6 in assembly with other components according to the present invention.
Figure 8:
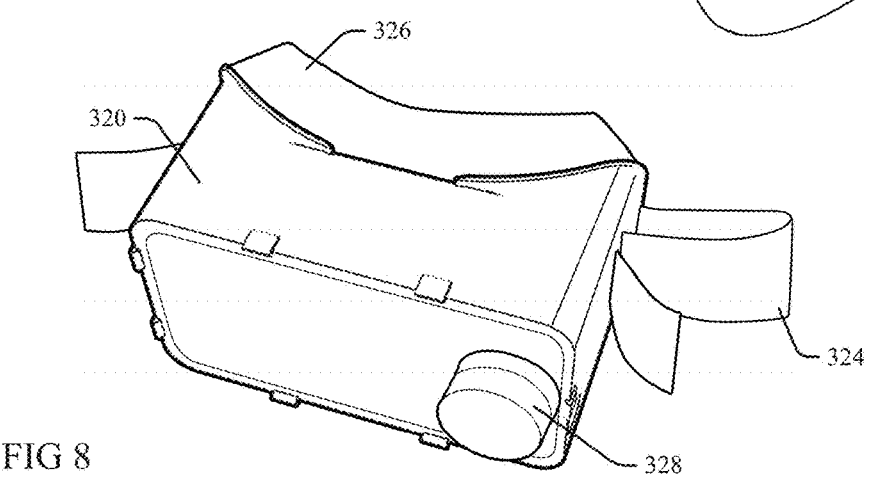
FIG. 8 is a front, top perspective graphic illustration of the assembly of FIG. 7.

FIGS. 6, 7 and 8 illustrate another example of an aspect of the present invention. FIG. 6 illustrates a molded plastic shell 320 that has two, individual eyeholes 322 and 323 adapted for presentation of visual data via one or more screens deployed therein. FIGS. 7 and 8 illustrate an adjustable strap 324 and a foam or elastomeric rubber gasket 326 that is adapted to conform to a user's face, each attached to the shell 320 and deployed in order to hold the shell 320 in engagement with a user's head and face. A front-mounted wide angle lens camera 328 is provided to capture video of the user's surroundings. It will be appreciated that other means and methods of holding the device shell 320 onto a user's face or eyes may be used, and this example is illustrative but not exhaustive. Aspects may satisfy a wide variety of consumer tastes, including those observable and evident in the marketplace, and designs may follow the dictates of available modern materials and manufacturing processes. System component designs may be visually attractive, easy to interact with and comfortable to wear for both capturing and playing photo-realistic immersive experiences.

Aspects of the present invention enable augmented reality experiences by blending the visual and audio data of the present, real world surrounding the user with VR and other data to present a seamless, reactive and customizable AR experience. The devices are easy to interact with and comfortable to wear for both capturing and playing photo-realistic immersive experiences, and experiences and presentations provided by the devices have the added benefit of being able to display multiple-layered visual overlays at varying opacity levels. VR experiences and AR data items can also be layered over real time experiences happening simultaneously, enabling a user to walk through a real environment while simultaneously viewing another experience, for instance a concert at a lower opacity level. These experiences have the benefit of being able to have additional augmented information layered on each experience (i.e. time stamps, way-finding information, weather, advertising etc.)

Figure 9:
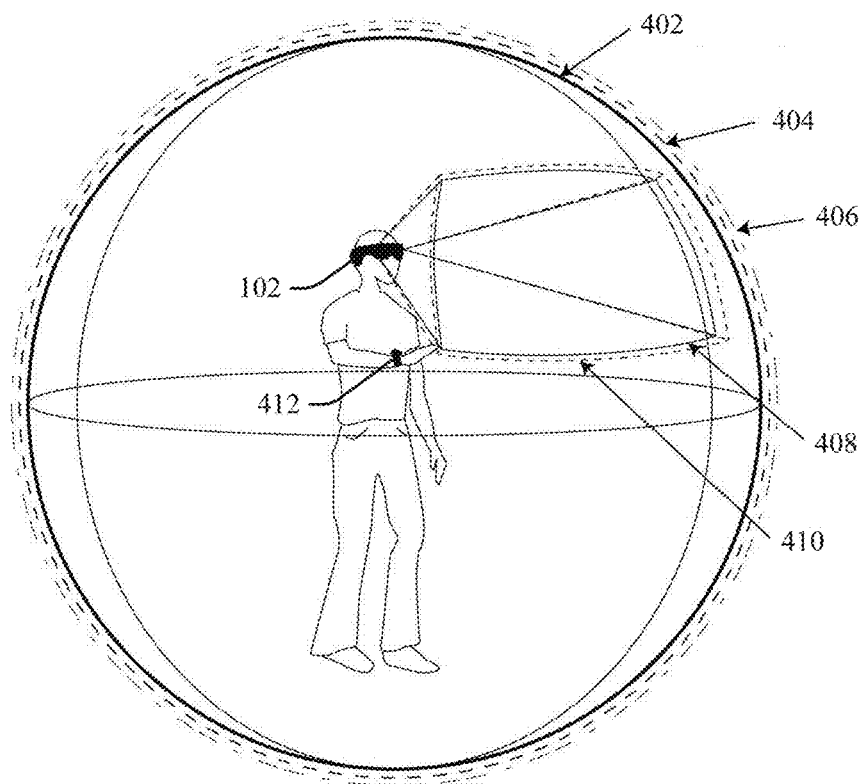
FIG. 9 is a side perspective graphic illustration of a virtual reality construct presentation to a user by a device according to the present invention.
Figure 10:
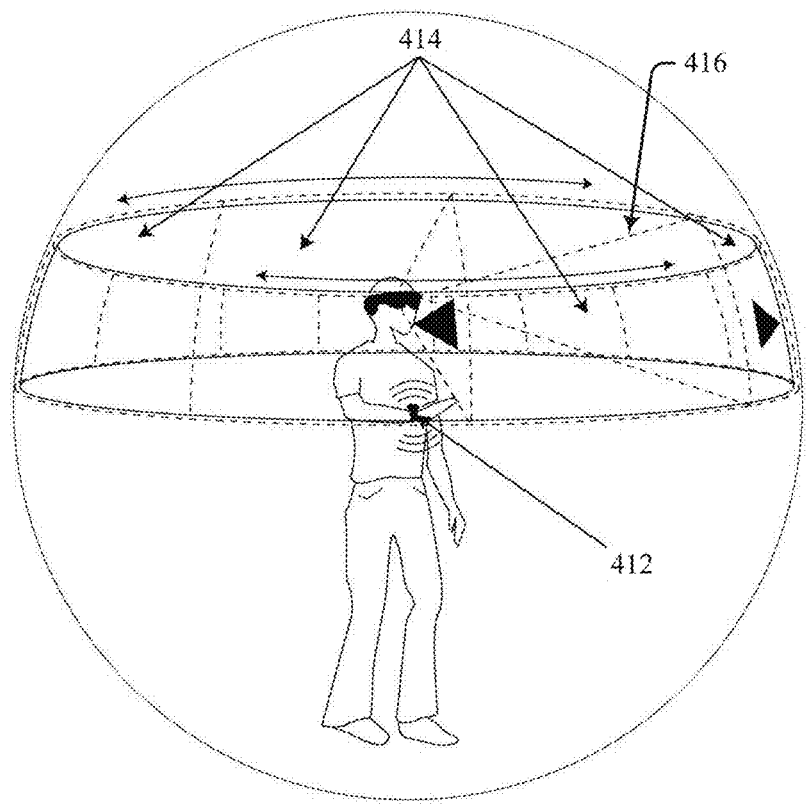
FIG. 10 is a side perspective graphic illustration of another virtual reality construct presentation to a user by a device according to the present invention.

FIGS. 9 and 10 illustrate examples of layered VR, AR and real environment experiences presented by the device 102. The display screens incorporated in the device 102 present a plurality of overlaid spherical visual and audio layers, in this example a primary visual layer 402, a secondary visual layer 404 and a directional sound layer 406. The device 102 selects (in response to inputs from the user, supervisors or other persons, alarm or communication inputs, etc.) or otherwise determines a primary active field of view portion window 408 of one of the visual layers 402 and 404, and a secondary active field of view portion window 410 of the other of the visual layers 402 and 404.

The primary visual layer 402 and the secondary visual layer 404 (or portions thereof) are coextensive with each other, meaning that they overlay each other and are each visible through the other, or not, based on their relative levels of opacity or transparency. In the present example, the user wears a wrist-watch style user input device ("watch device") 412 that generates selection inputs to the device 102 to select relative levels of transparency and opacity of the visual layer levels 402 and 404 in response to physical gestures or motions sensed by motion sensors within the input device 412, to buttons pushed on the watch device 412, or to commands spoken to the watch device 412 or to the device itself 102, etc. For example, the user may raise his hand to hold the watch device 412 as shown and make a swiping outward motion, wherein motion sensors interpret this as a "stop" or "switch" command when a VR layer is currently selected as the primary active field of view portion window 408, causing the device to switch the layers presented in the primary active field of view portion window 408 and the secondary active field of view portion window 410; or to a current world view of the user via the cameras incorporated on the device 102, or via turning off all VR or AR feeds and rendering lens translucent to the outside world. It will be appreciated that other hand-held devices (tablets, phones, etc.) may also provide these functions in a wireless communication with the device 102.

FIG. 10 illustrates one aspect wherein one of the primary visual layer 402 and the secondary visual layer 404 is divided into a plurality of different window segments 414 that may be selected by the user or the device 102, for example, different browser windows that provide weather web sites, email inboxes, navigation route screens, sporting events, videoconference calls from family members or business associates, etc. The windows 414 may be spun through boundaries 416 of the primary active window 408 for selection, such by a side-swiping motion that one would use to spin globe, with a stop motion input from the watch device 412 (or verbally, etc.) stopping the spinning windows 414 on a selected, desired one when within the primary active window boundaries 416.

It will be understood aspects of the present invention may provide multiple other visual layers (tertiary and beyond) and/or additional, directional sound layers for presentment and/or selection by the user. The present example of FIGS. 9 and 10 focuses on only two visual layers and one sound layer merely for simplicity of illustration and discussion, and is not limiting.

Selections of the respective primary visual layer 402, secondary visual layer 404, window portions 414, primary active field of view portion window 408 and secondary active field of view portion window 410 may be via levels of opacity, wherein a selected (primary) layer or window is given predominant or complete visibility within (at least) the primary active field of view portion window 408, while other layers of windows are rendered more transparent or even not-visible while unselected. More particularly, the device 102 is able to display multiple layered visual overlays at varying opacity levels. Thus, VR and AR experiences and data can be layered over real time experiences happening simultaneously, enabling a user to walk through a real environment while simultaneously viewing another experience, for instance a concert at a lower opacity level. These experiences have the benefit of being able to have additional augmented information layered on each experience (i.e. time stamps, way-finding information, weather, advertising etc.)

Where the head-mounted display device 102 houses a fully functional wireless computer (or mobile phone) with an integrated camera array including a forward facing camera, the camera can act as a surrogate for user's eyes. High resolution displays, surround sound microphones, high quality audio playback via headphones, global positioning satellite (GPS) rechargeable power sources and accelerometer components further improve the immersive nature of the VR and AR experience and enable the device 102 to both locate the user geographically within his current environment and to sync his movements with corresponding movements through geographic features of the VR world (for example, to show in multiple layers the user walking down a current street via the cameras on the device, and a street in the VR world).

This syncing also decouples the display of the alternative VR or AR environments from the perspectives of users wearing the device 102 and thereby generating the alternative environment data at the time of its recording or streaming. For example, when a user viewing a VR construct via the display screens 110 of the device 102 turns his head to see to the left or right, or stops and turns around, the user will see those corresponding portions of the VR construct (the left or right side views, or what is visible to the rear), even though the recording/streaming user may continue to look straight ahead, or otherwise look in a different direction. The user experiencing the VR construct is not limited to the viewpoint of the other user, as she would be with a conventional point-of-view camera recording.

Aspects of the present invention allow for distinctive and different viewing situations or modes. One mode is a "passive mode" that allows the user to see the surrounding real time physical environment using forward-facing camera streams as a substitute for the user's eyes, and wherein additional augmented information may be layered on top of this experience, for example arranged as a selectable ring or band of the graphical tiles or windows 414 of FIG. 10.

Another mode is a "fully immersive" mode that presents a pre-recorded experience or streaming of real-time visual images (created by integrated, modular or remote controlled capturing devices, such as other devices 102 worn by others) as the primary layer that is opaque to other layers. A "blended" mode blends the real-time, "passive" mode experience and the "fully immersive" pre-recorded/streamed experiences, allowing the user to view multiple layered information or experiences at one time (the number of which is unlimited and may be layered in concentric spheres or tiles or segments) in varying levels of adjustable (user-controlled, through gestural or touch) opacity, for example as discussed above with respect to FIGS. 9 and 10.

The device 102 may provide for automatic variations of panoramic video feed opacity within an AR or VR headset deployment based on positional tracking data. In addition to or rather than manually controlling opacity settings, a video feed's opacity may be governed by sensors within the headset (accelerometer, gyro, magnetometer, cameras). Based on sensor data, a headset 102 onboard computer can determine the user's current activity and automatically vary the video opacity appropriately. For example, if the user is walking (which can be determined in a similar manner to how a pedometer counts steps), the VR or AR video feed may become primarily transparent so that the user can navigate safely. If nearby motion is detected, or motion that meets a certain threshold is determined, the video may become fully transparent to the surrounding world. For example, the device 102 may distinguish between random motions that present no likely hazard (other pedestrian movements remote from the user and unlikely to engage the user) from movements that indicate that an object the size of another pedestrian is moving toward the user on a collision course, and only trigger the transparent/safety setting in response to the latter.

If the user is stopped, indicating that walking or other travelling motion has ended, the device 102 may automatically increase the opacity of the VR feed layers to maximum to immerse the user in the other, virtual world experience. Similarly, the device 102 may use GPS or wireless communication with transport devices to determine that the user is a passenger in a passenger or mass transit vehicle (and is not driving said vehicle), or is in an otherwise appropriate activity or location for the "passive," fully-immersive VR mode, and automatically select the appropriate, relative layer opacities.

Layer selections and relative opacities may be made based on pre-determined priorities. For example, a call or visual data from a designated party or location (work, a spouse, a caregiver in charge of a child or elderly or infirm family member, a fire or burglar alarm system, etc.) may be given an override priority, so that when the device 102 receives data meeting override criteria the data will automatically override current primary window or sound layer selections and be moved to the primary active window 408 or a primary sound layer at a maximum, intelligible volume (relative to the volume of other sound layers, or to the sensed volume of background sounds as determined through microphones on the device 102).

User created experiences can easily be shared with other users via wireless communications between different user devices 102 (for example, through the internet, or public or private local or wide area networks, or other proprietary network, etc.). In particular, by providing panoramic audio and video recording that captures a full 360 degree horizontal field of view of the surrounding world, and especially the completer spherical data illustrated by the construct 312 of FIG. 5, and tracking elements of the environment surrounding the user in all directions around the user, provides comprehensive data that is more useful and complete relative to exclusively receiving video data from the viewpoint of the user. The information presented to another user, or viewed later by the same user from recorded data, is entirely independent from the front-facing point of view of the recording user. Thus, a user may walk down a street while facing forward during recording/streaming of video data in 360 degrees. Another user receiving the stream, or the same user immersing himself in a VR construct of the street scene generated from the recorded data at a later time, may turn her head to look to one side and be able to see the information available from that different side perspective view, or even look behind the user wearing the recording/streaming device, thereby seeing something that the recording/streaming user cannot see and even have awareness of. The person enjoying or otherwise using the recorded/streamed data may engage and view the VR or AR construct entirely independently of the actual viewpoint of the recording/streaming user. Thus, tracking elements of the environment in all directions around the user rather than exclusively in front of them, and indexing the location of the visual elements geographically, assists with accurate augmented reality experiences and provides a more seamless, natural AR experience by enabling the user to engage the constructs via three-dimensional referencing.

Aspects allow viewers to have an immersive point of view where they are actually a part of or inside of a pre-recorded or real time experience. Immersive training or education or virtual conferencing may also enable a viewing user to go beyond the primary activity or focus of the user recording or streaming an event. Aspects may also be used in a variety of contexts beyond entertainment and business applications. For example, public safety personnel may be assisted by others via remote connection to the device 102 while worn in a public safety setting. Thus, a firefighter in a burning building may be warned by remote alarm office personnel monitoring the present situation via a 360 video degree feed from the device 102 that fire is expanding behind the firefighter and potentially blocking egress, so that she may take evasive or fire suppressive actions accordingly.

In addition to the head mounted displays discussed thus far, aspects may include alternative viewing options such as a multi-projection system that can project immersive experiences on the inside walls of a room, or other architectural detail or special screen (spherical or semi-spherical).

The examples discussed thus far have focused on visual and audio data. However, it will be appreciated that other sensory data may be acquired by devices according to the present invention in order to generate or create fully immersive VR and AR experience constructs. For example, temperature, wind, humidity, solar radiation, radiant heat from campfires and wood stoves, tactile and other "feel" sense data may be acquired and used to create similar VR and AR environments (via use of heater elements, fans, humidifiers or dehumidifiers, etc.) Air samples may be taken to generate and recreate smells in the air that are experienced by the recording/streaming user. Samples of fluids and foods, or atomized elements in the atmosphere, may be gathered and analyzed to generate and recreate tastes and/or smells that are experienced by the recording/streaming user, for example to recreate a seashore salt smell presented by the ocean. These additional sensory data inputs may also provide for enhanced safety, for example automatically detecting a natural gas leak and triggering an alarm to the recording/streaming user to vacate a current location.

Aspects display multiply-layered visual overlays at varying opacity levels in providing both VR and AR environments. Real-world sensory data and experiences can also be layered over other real time experiences happening simultaneously. For example, a user may walk through a given, real (first) environment, such as an urban sidewalk or a hallway corridor in an office building, dormitory, etc., and receive sensory data acquired therefrom via the device cameras and microphones, while simultaneously receiving and viewing and/or listening to data from another (second) environment (for instance, a musical concert, another street located in a different geographic area, or the same environment represented by audio and video data recorded at an earlier, different time) that is blended in with the data from the first environment.

Figure 11:
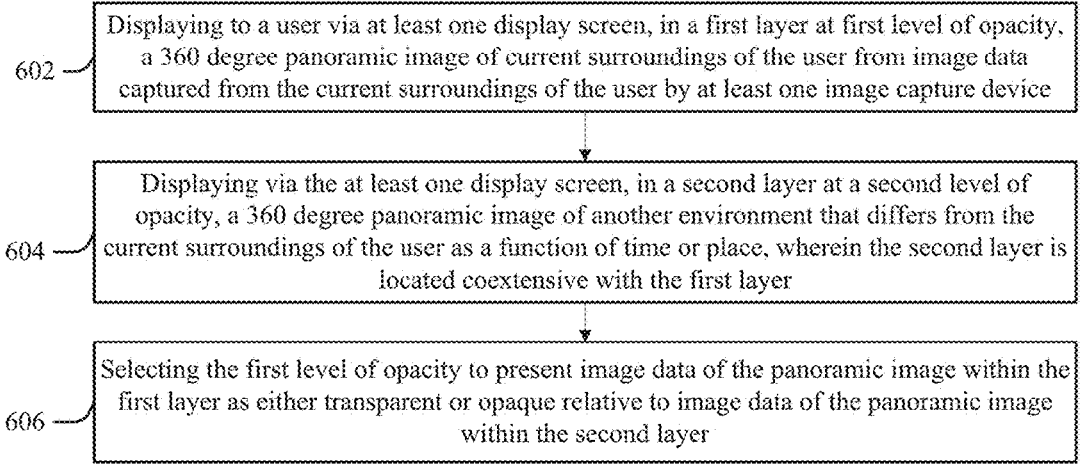
FIG. 11 is a flow chart illustration of a method according to the present invention.

FIG. 11 illustrates a method according to the present invention for capturing, viewing, presenting or displaying photo-realistic, fully-immersive panoramic images of virtual environments. At 602 the method includes displaying to a user, via at least one display screen (for example, the screen 110), in a first layer at first level of opacity, a 360 degree panoramic image of current surroundings of the user from image data captured from the current surroundings of the user by at least one image capture device (for example, the image capture components 104, 106 or 108).

At 604 the method includes displaying via the at least one display screen, in a second layer at a second level of opacity, a 360 degree panoramic image of another environment that differs from the first layer panoramic image of the current surroundings of the user as a function of time or place, wherein the second layer is located coextensive with the first layer. Lastly, at 606 the method includes selecting the first level of opacity to present image data of the panoramic image within the first layer as transparent relative to image data of the panoramic image within the second layer (so that the second layer becomes primary visual information, such as within the primary window 408); or opaque relative to image data of the panoramic image within the second layer (so that the first layer becomes the primary visual information, such as within the primary window 408).

Figure 12:
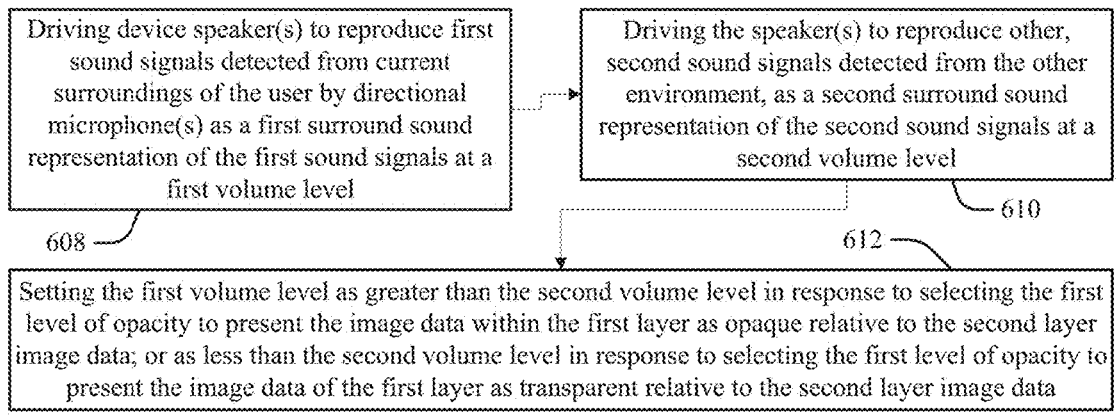
FIG. 12 is a flow chart illustration of another method according to the present invention.

FIG. 12 illustrates another method, in some aspects as a furtherance of the method steps of FIG. 11. At 608 the method includes driving one or more device speakers (for example, the speakers 112) to reproduce (first) sound signals that are detected from the current surroundings of the user by one or more directional microphones (for example, the sound capture components at 104, 106 or 108) as a (first) surround sound representation of the said (first) sound signals in a first volume level. At 610 the method includes driving the speaker(s) to reproduce other (second) sound signals that are detected from the other environment, as a second surround sound representation of the second sound signals in a second volume level. Accordingly, the method includes at 612 setting the first volume level to be greater than the second volume level in response to selecting the first level of opacity to present the image data of the panoramic image within the first layer as opaque relative to the image data of the panoramic image within the second layer; or as less than the second volume level in response to selecting the first level of opacity to present the image data of the panoramic image within the first layer as transparent relative to the image data of the panoramic image within the second layer.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium excludes transitory, propagation or carrier wave signals or subject matter and includes an electronic, magnetic, optical or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that does not propagate but can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electromagnetic or optical forms or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus, provide processes for implementing the functions/acts specified in the flowchart and/or block diagram block or blocks.

Figure 13:
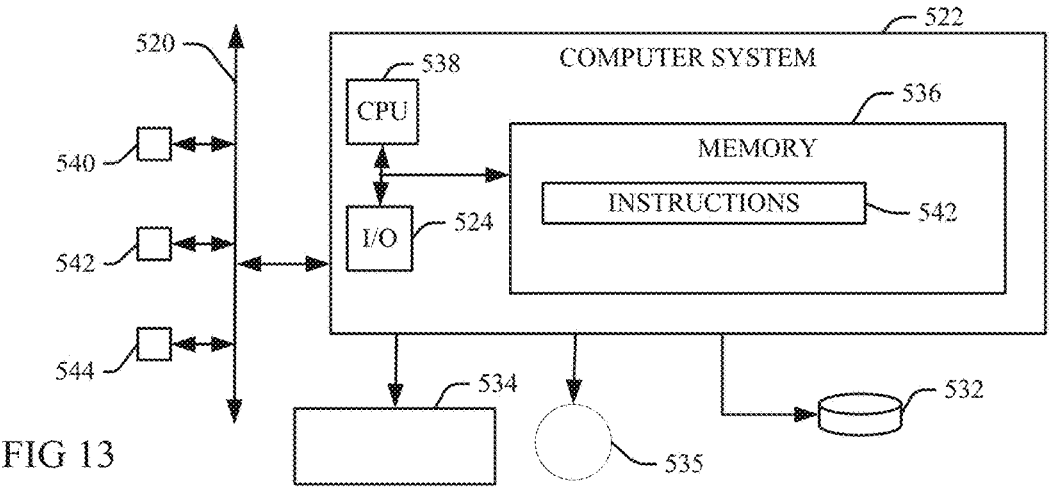
FIG. 13 is a block diagram of a computer system implementation of an aspect of the present invention.

Referring now to FIG. 13, an exemplary computerized implementation of an aspect of the present invention includes a computer system or other programmable device 522 in communication 520 with a storage device or other image and sound recording device 540 that provides image and sound data for a VR or AR environment. The programmable device 522 is also in communication with one or more image data capture devices (cameras, scanners, etc.) 542 and directional microphones 544 for acquiring panoramic image data and sound data of the immediate surroundings of the device 522 or of a user. The programmable device 522 is further in communication with a display screen 534 and a speaker 535.

Instructions 542 reside within computer readable code in a computer readable memory 536, or in a computer readable storage system 532 that is accessed by a Central Processing Unit (processor or CPU) 538 of the programmable device 522. An input/output device (I/O) 524 further enables wireless communications and other inputs and outputs. Thus, the instructions, when implemented by the processor 538, cause the processor 538 to display to a user via the display screen 534, in a first layer at first level of opacity, a 360 degree panoramic image of surroundings of the user from image data captured by the image capture device 542; display via the display screen 534, in a second layer at a second level of opacity, a 360 degree panoramic image of an environment that differs from the first layer panoramic image of surroundings of the user as a function of time or place, wherein the second layer is located coextensive with the first layer; and select one of the first level of opacity and the second level of opacity to present image data of the panoramic image within one of the first layer and the second layer as: transparent to image data of the panoramic image within the other the first layer and the second layer; or as opaque to image data of the panoramic image within the other of the first layer and the second layer.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification, specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The aspect was chosen and described in order to best explain the principles of the invention and the practical application, and to enable others of ordinary skill in the art to understand the invention for various embodiments with various modifications as are suited to the particular use contemplated.

The flowchart and block diagrams in the figures illustrate the architecture, functionality, and operation of possible implementations of systems, methods and computer program products according to various aspects of the present invention. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system, comprising:
    a processor;
    a computer readable memory in circuit communication with the processor;
    a computer readable storage medium in circuit communication with the processor;
    at least one image capture device in circuit communication with the processor; and
    at least one display screen in circuit communication with the processor; and
    wherein the processor executes program instructions stored on the computer-readable storage medium via the computer readable memory and thereby:
    displays via the at least one display screen, in a first layer at first level of opacity, an image of current surroundings of the system from image data captured by the at least one image capture device from the current surroundings of the system, wherein the image within the first layer is image data of a surrounding real time physical environment of the user while wearing the system;
    displays via the at least one display screen, in a second layer at a second level of opacity, an image of another environment that differs from the current surroundings of the system as a function of time or of place, wherein the second layer is located coextensive with the first layer;
    selects the first level of opacity to present image data of the image within the first layer from the group consisting of transparent relative to image data of the image within the second layer, thereby blending a streaming of real-time visual images of the surrounding real time physical environment of the user wearing the system with the second layer image data of the another environment, and opaque relative to image data of the image within the second layer;
    in response to determining that the user is walking, presents the image data within the second layer at a first level of transparency; and
    in response to determining that the user is stationary, presents the image data within the second layer at a second level of transparency that is more opaque than the first level of transparency.

2. The system of claim 1, wherein the at least one image capture device is a front facing camera.

3. The system of claim 2, wherein the image of the another environment is a 360 degree panoramic image construct; and
wherein the processor executes the program instructions stored on the computer-readable storage medium via the computer readable memory and thereby:
syncs turning movements of a head of the user to the left or to the right with corresponding movement through geographic features of the 360 degree panoramic image construct of the another environment; and
displays via the at least one display screen, in the second layer at the second level of opacity, portions of the image of another environment that correspond with a viewpoint of the user during the turning movements of the head of the user to the left or to the right.

4. The system of claim 3, wherein the processor executes the program instructions stored on the computer-readable storage medium via the computer readable memory and thereby:
selects the first level of transparency to present real-time visual images of the surrounding real time physical environment of the user wearing the system to enable the user to see and walk through the physical environment of the user while simultaneously viewing the second layer image data of the 360 degree panoramic image construct of the another environment.

5. The system of claim 4, wherein the processor executes the program instructions stored on the computer-readable storage medium via the computer readable memory and thereby:
in response to a determination that the user is walking and moving toward a collision with another object, presents the image data within the second layer at a third level of transparency that is more transparent than the first level of transparency.

6. A system, comprising:
a processor;
a computer readable memory in circuit communication with the processor;
a computer readable storage medium in circuit communication with the processor;
at least one image capture device in circuit communication with the processor;
at least one display screen in circuit communication with the processor;
at least one directional microphone in circuit communication with the processor; and
at least one speaker in circuit communication with the processor;
wherein the processor executes program instructions stored on the computer-readable storage medium via the computer readable memory and thereby:
displays via the at least one display screen, in a first layer at first level of opacity, an image of current surroundings of the system from image data captured by the at least one image capture device from the current surroundings of the system;
displays via the at least one display screen, in a second layer at a second level of opacity, an image of another environment that differs from the current surroundings of the system as a function of time or of place, wherein the second layer is located coextensive with the first layer; and
selects the first level of opacity to present image data of the image within the first layer from the group consisting of transparent relative to image data of the image within the second layer, and opaque relative to image data of the image within the second layer;
drives the at least one speaker to reproduce first sound signals that are detected from the current surroundings of the system by the at least one directional microphone, as a first surround sound representation of the first sound signals in a first volume level;
drives the at least one speaker to reproduce second sound signals that are detected from the another environment, as a second surround sound representation of the second sound signals in a second volume level;
sets the first volume level to be greater than the second volume level in response to selecting the first level of opacity to present the image data of the image within the first layer as opaque relative to the image data of the image within the second layer; and
sets the second volume level to be greater than the first volume level in response to selecting the first level of opacity to present the image data of the image within the first layer as transparent relative to the image data of the image within the second layer.

7. A computer program product for capturing, viewing, presenting and displaying photo-realistic, fully-immersive panoramic virtual environments, the computer program product comprising:
a computer readable storage medium having computer readable program code embodied therewith, the computer readable program code comprising instructions for execution by a processor that cause the processor to:
display to a user via at least one display screen, in a first layer at a first level of opacity, an image of current surroundings of the user from image data captured by at least one image capture device from the current surroundings of the system, wherein the image within the first layer is image data of a surrounding real time physical environment of the user while wearing the system;
display via the at least one display screen, in a second layer at a second level of opacity, an image of another environment that differs from the current surroundings of the user as a function of time or of place, wherein the second layer is located coextensive with the first layer;
select the first level of opacity to present image data of the panoramic image within the first layer from the group consisting of transparent relative to image data of the panoramic image within the second layer, thereby blending a streaming of real-time visual images of the surrounding real time physical environment of the user wearing the system with the second layer image data of the another environment, and opaque relative to image data of the panoramic image within the second layer;
in response to determining that the user is walking, present the image data within the second layer at a first level of transparency; and
in response to determining that the user is stationary, present the image data within the second layer at a second level of transparency that is more opaque than the first level of transparency.

8. The computer program product of claim 7, wherein the at least one image capture device is a front facing camera.

9. The computer program product of claim 8, wherein the image of the another environment is a 360 degree panoramic image construct; and
wherein the computer readable program code instructions for execution by the processor further cause the processor to:

sync turning movements of a head of the user to the left or to the right with corresponding movement through geographic features of the 360 degree panoramic image construct of the another environment; and display via the at least one display screen, in the second layer at the second level of opacity, portions of the image of another environment that correspond with a viewpoint of the user during the turning movements of the head of the user to the left or to the right.

10. The computer program product of claim 9, wherein the computer readable program code instructions for execution by the processor further cause the processor to:

select the first level of transparency to present real-time visual images of the surrounding real time physical environment of the user wearing the system to enable the user to see and walk through the physical environment of the user while simultaneously viewing the second layer image data of the 360 degree panoramic image construct of the another environment.

11. The computer program product of claim 10, wherein the computer readable program code instructions for execution by the processor further cause the processor to:

in response to a determination that the user is walking and moving toward a collision with another object, present the image data within the second layer at a third level of transparency that is more transparent than the first level of transparency.

12. A computer program product for capturing, viewing, presenting and displaying photo-realistic, fully-immersive panoramic virtual environments, the computer program product, the computer program product comprising:

a computer readable storage medium having computer readable program code embodied therewith, the computer readable program code comprising instructions for execution by a processor that cause the processor to:

display to a user via at least one display screen, in a first layer at a first level of opacity, an image of current surroundings of the user from image data captured by at least one image capture device from the current surroundings of the system;

display via the at least one display screen, in a second layer at a second level of opacity, an image of another environment that differs from the current surroundings of the user as a function of time or of place, wherein the second layer is located coextensive with the first layer;

select the first level of opacity to present image data of the image within the first layer from the group consisting of transparent relative to image data of the image within the second layer, and opaque relative to image data of the image within the second layer;

drive at least one speaker to reproduce first sound signals that are detected from the current surroundings of the system by at least one directional microphone, as a first surround sound representation of the first sound signals in a first volume level;

drive the at least one speaker to reproduce second sound signals that are detected from the another environment, as a second surround sound representation of the second sound signals in a second volume level;

set the first volume level to be greater than the second volume level in response to selecting the first level of opacity to present the image data of the image within the first layer as opaque relative to the image data of the image within the second layer; and set the second volume level to be greater than the first volume level in response to selecting the first level of opacity to present the image data of the image within the first layer as transparent relative to the image data of the image within the second layer.

13. A method for capturing, viewing, presenting and displaying photo-realistic, fully-immersive panoramic virtual environments, the method comprising:

displaying to a user via at least one display screen, in a first layer at a first level of opacity, an image of current surroundings of the user from image data captured from the current surroundings of the user by at least one image capture device, wherein the image within the first layer is image data of a surrounding real time physical environment of the user while wearing the system;

displaying via the at least one display screen, in a second layer at a second level of opacity, an image of another environment that differs from the current surroundings of the user as a function of time or of place, wherein the second layer is located coextensive with the first layer;

selecting the first level of opacity to present image data of the panoramic image within the first layer from the group consisting of transparent relative to image data of the panoramic image within the second layer, thereby blending a streaming of real-time visual images of the surrounding real time physical environment of the user wearing the system with the second layer image data of the another environment, and opaque relative to image data of the panoramic image within the second layer;

in response to determining that the user is walking, presenting the image data within the second layer at a first level of transparency; and in response to determining that the user is stationary, presenting the image data within the second layer at a second level of transparency that is more opaque than the first level of transparency.

14. The method of claim 13, wherein the at least one image capture device is a front facing camera.

15. The method of claim 14, wherein the image of the another environment is a 360 degree panoramic image construct, the method further comprising:

syncing turning movements of a head of the user to the left or to the right with corresponding movement through geographic features of the 360 degree panoramic image construct of the another environment; and displaying via the at least one display screen, in the second layer at the second level of opacity, portions of the image of the another environment that correspond with a viewpoint of the user during the turning movements of the head of the user to the left or to the right.

16. The method of claim 15, further comprising:

selecting the first level of transparency to present real-time visual images of the surrounding real time physical environment of the user wearing the system to enable the user to see and walk through the physical environment of the user while simultaneously viewing the second layer image data of the 360 degree panoramic image construct of the another environment; and in response to a determination that the user is walking and moving toward a collision with another object, presenting the image data within the second layer at a third level of transparency that is more transparent than the first level of transparency.

17. A method for capturing, viewing, presenting and displaying photo-realistic, fully-immersive panoramic virtual environments, the method comprising:

displaying via at least one display screen, in a first layer at first level of opacity, an image of current surroundings of the system from image data captured by the at least one image capture device from the current surroundings of the system;

displaying via the at least one display screen, in a second layer at a second level of opacity, an image of another environment that differs from the current surroundings of the system as a function of time or of place, wherein the second layer is located coextensive with the first layer;

selecting the first level of opacity to present image data of the image within the first layer from the group consisting of transparent relative to image data of the image within the second layer, and opaque relative to image data of the image within the second layer;

driving at least one speaker to reproduce first sound signals that are detected from the current surroundings of the user by at least one directional microphone, as a first surround sound representation of the first sound signals in a first volume level;

driving the at least one speaker to reproduce second sound signals that are detected from the another environment, as a second surround sound representation of the second sound signals in a second volume level;

setting the first volume level to be greater than the second volume level in response to selecting the first level of opacity to present the image data of the image within the first layer as opaque relative to the image data of the image within the second layer; and setting the second volume level to be greater than the first volume level in response to selecting the first level of opacity to present the image data of the image within the first layer as transparent relative to the image data of the image within the second layer.

* * * * *